US012794781B2

(12) United States Patent
Somashekar et al.

(10) Patent No.: US 12,794,781 B2
(45) Date of Patent: Nov. 10, 2026

(54) ARTIFICIAL INTELLIGENCE ASSISTED DYNAMIC SLICE MODIFICATION

(71) Applicant: T-Mobile USA, Inc., Bellevue, WA (US)

(72) Inventors: Sharath Somashekar, Overland Park, KS (US); Diego Andres Estrella Chavez, Tysons, VA (US); Tejaswini S. Patil, Herndon, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 4 days.

(21) Appl. No.: 18/898,503

(22) Filed: Sep. 26, 2024

(65) Prior Publication Data

US 2026/0089063 A1 Mar. 26, 2026

(51) Int. Cl.
*H04L 41/122* (2022.01)
*H04L 41/16* (2022.01)
*H04L 41/5009* (2022.01)

(52) U.S. Cl.
CPC ............ *H04L 41/122* (2022.05); *H04L 41/16* (2013.01); *H04L 41/5009* (2013.01)

(58) Field of Classification Search
None
See application file for complete search history.

(56) References Cited

U.S. PATENT DOCUMENTS

| | | | |
|---|---|---|---|
| 10,142,994 | B2 | 11/2018 | Lee et al. |
| 10,433,177 | B2 | 10/2019 | Kodaypak et al. |
| 10,623,257 | B1 | 4/2020 | Marquardt et al. |
| 10,667,179 | B1 | 5/2020 | Young et al. |
| 10,708,368 | B1 | 7/2020 | Young et al. |
| 10,764,789 | B2 | 9/2020 | Qiao et al. |
| 10,791,040 | B2 | 9/2020 | Vrzic |
| 10,863,556 | B2 | 12/2020 | Lau et al. |
| 10,986,010 | B2 | 4/2021 | Kodaypak et al. |
| 11,012,872 | B1 | 5/2021 | Bellamkonda et al. |
| 11,071,055 | B1 | 7/2021 | Wang et al. |
| 11,172,435 | B2 | 11/2021 | Wei et al. |
| 11,202,231 | B2 | 12/2021 | Park et al. |
| 11,265,220 | B1 | 3/2022 | Kushwaha et al. |

(Continued)

FOREIGN PATENT DOCUMENTS

| | | | |
|---|---|---|---|
| CN | 111698725 | A | 9/2020 |
| CN | 111836291 | A | 10/2020 |

(Continued)

*Primary Examiner* — Raqiul A Choudhury

(74) *Attorney, Agent, or Firm* — Ashurst Perkins Coie US LLP

(57) ABSTRACT

Methods, devices, and systems related to dynamic modifications of slicing configuration are disclosed. In one example aspect, a method for wireless communication includes receiving, by a network server implemented as a slice orchestrator, information from a user device that is configured to operate using an instance of a network slice; determining, by the slice orchestrator based on one or more machine learning models, a difference between actual slice performance and expected slice performance according to the information; and dynamically updating, by the slice orchestrator, configuration information for the network slice according to the difference between the actual slice performance and the expected slice performance.

20 Claims, 15 Drawing Sheets

(56) References Cited

U.S. PATENT DOCUMENTS

| | | | |
|---|---|---|---|
| 11,304,129 | B2 | 4/2022 | Kedalagudde et al. |
| 11,336,538 | B2 | 5/2022 | Akman et al. |
| 11,395,220 | B2 | 7/2022 | Li |
| 11,405,931 | B2 | 8/2022 | Gupta et al. |
| 11,419,046 | B2 | 8/2022 | Fiorese et al. |
| 11,424,977 | B2 | 8/2022 | Ravichandran et al. |
| 11,444,851 | B2 | 9/2022 | Young |
| 11,528,591 | B2 | 12/2022 | Zhu et al. |
| 11,540,197 | B2 | 12/2022 | Huang et al. |
| 11,553,502 | B2 | 1/2023 | Bisaria et al. |
| 11,563,652 | B2 | 1/2023 | Seetharaman et al. |
| 11,564,159 | B2 | 1/2023 | Kwok et al. |
| 11,606,303 | B1 | 3/2023 | Jagannatha et al. |
| 11,683,740 | B2 | 6/2023 | Zheng |
| 11,696,184 | B2 | 7/2023 | Tiwari et al. |
| 11,700,628 | B2 | 7/2023 | Sabella et al. |
| 11,711,267 | B2 | 7/2023 | Parker et al. |
| 11,778,514 | B2 | 10/2023 | Zheng |
| 11,785,633 | B2 | 10/2023 | Xing |
| 11,825,332 | B2 | 11/2023 | Schliwa-bertling et al. |
| 11,895,577 | B2 | 2/2024 | Jia et al. |
| 12,052,658 | B2 | 7/2024 | Asthana et al. |
| 12,075,346 | B2 | 8/2024 | Wang et al. |
| 12,369,062 | B2 | 7/2025 | Chou |
| 2017/0367036 | A1 | 12/2017 | Chen et al. |
| 2019/0037409 | A1 | 1/2019 | Wang et al. |
| 2019/0364495 | A1 | 11/2019 | Mildh et al. |
| 2020/0044943 | A1 | 2/2020 | Bor-Yaliniz et al. |
| 2020/0154280 | A1 | 5/2020 | Deviprasad et al. |
| 2020/0178158 | A1 | 6/2020 | Won et al. |
| 2020/0367109 | A1 | 11/2020 | Chen et al. |
| 2021/0112428 | A1* | 4/2021 | Young ................. H04L 41/0895 |
| 2021/0112565 | A1 | 4/2021 | Bhaskaran et al. |
| 2021/0289436 | A1 | 9/2021 | Hu et al. |
| 2021/0351989 | A1* | 11/2021 | Toy ......................... H04L 47/83 |
| 2021/0400445 | A1 | 12/2021 | Chai |
| 2022/0014951 | A1 | 1/2022 | Young et al. |
| 2022/0086864 | A1 | 3/2022 | Sabella et al. |
| 2022/0116816 | A1 | 4/2022 | Liang et al. |
| 2022/0124560 | A1 | 4/2022 | Yeh et al. |
| 2022/0141762 | A1 | 5/2022 | Kalra et al. |
| 2022/0330027 | A1 | 10/2022 | Djukic et al. |
| 2022/0345996 | A1 | 10/2022 | Jeong et al. |
| 2022/0417758 | A1 | 12/2022 | Nooren et al. |
| 2023/0006889 | A1 | 1/2023 | Thyagaturu et al. |
| 2023/0007573 | A1 | 1/2023 | Kolan |
| 2023/0037228 | A1 | 2/2023 | Panigrahi et al. |
| 2023/0073937 | A1 | 3/2023 | Mujumdar et al. |
| 2023/0074779 | A1 | 3/2023 | Stjernholm et al. |
| 2023/0090021 | A1 | 3/2023 | Kotaru et al. |
| 2023/0129575 | A1 | 4/2023 | Chou |
| 2023/0189189 | A1 | 6/2023 | Venkataraman et al. |
| 2023/0336985 | A1 | 10/2023 | Zisimopoulos et al. |
| 2024/0007314 | A1 | 1/2024 | Yao et al. |
| 2024/0022443 | A1* | 1/2024 | Ananthanarayanan ...................... H04L 45/64 |
| 2024/0214822 | A1 | 6/2024 | Buyukdura |
| 2024/0224072 | A1 | 7/2024 | Mahimkar et al. |
| 2024/0267827 | A1 | 8/2024 | Patel et al. |
| 2024/0340708 | A1* | 10/2024 | Rahman .................. H04L 41/16 |
| 2024/0388945 | A1* | 11/2024 | Karapantelakis ..... H04W 24/10 |
| 2025/0056392 | A1* | 2/2025 | Cho ...................... H04W 76/10 |

FOREIGN PATENT DOCUMENTS

| | | | |
|---|---|---|---|
| CN | 110719571 | B | 12/2020 |
| CN | 112423312 | A | 2/2021 |
| CN | 113133087 | A | 7/2021 |
| CN | 110730478 | B | 12/2021 |
| CN | 111741512 | B | 8/2022 |
| CN | 110830542 | B | 1/2023 |
| CN | 111278016 | B | 3/2023 |
| CN | 112929187 | B | 4/2023 |
| CN | 111866953 | B | 5/2023 |
| CN | 110769468 | B | 6/2023 |
| DE | 102014224372 | B4 | 1/2023 |
| EP | 3461172 | A1 | 3/2019 |
| EP | 3445072 | B1 | 9/2019 |
| EP | 3761751 | A1 | 1/2021 |
| EP | 3437367 | B1 | 6/2021 |
| EP | 3849103 | A1 | 7/2021 |
| EP | 3544337 | B1 | 1/2022 |
| KR | 20170114923 | A | 10/2017 |
| KR | 20170119296 | A | 10/2017 |
| WO | 2019120109 | A1 | 6/2019 |
| WO | 2020093780 | A1 | 5/2020 |
| WO | 2020250005 | A1 | 12/2020 |
| WO | 2021001086 | A1 | 1/2021 |
| WO | 2021021580 | A1 | 2/2021 |
| WO | 2021022966 | A1 | 2/2021 |
| WO | 2021103647 | A1 | 6/2021 |
| WO | 2021247725 | A1 | 12/2021 |

* cited by examiner

ARTIFICIAL INTELLIGENCE ASSISTED DYNAMIC SLICE MODIFICATION

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency, are also important to meeting the needs of various communication scenarios.

BRIEF DESCRIPTION OF THE DRAWINGS

Detailed descriptions of implementations of the present invention will be described and explained through the use of the accompanying drawings.

Figure 1:
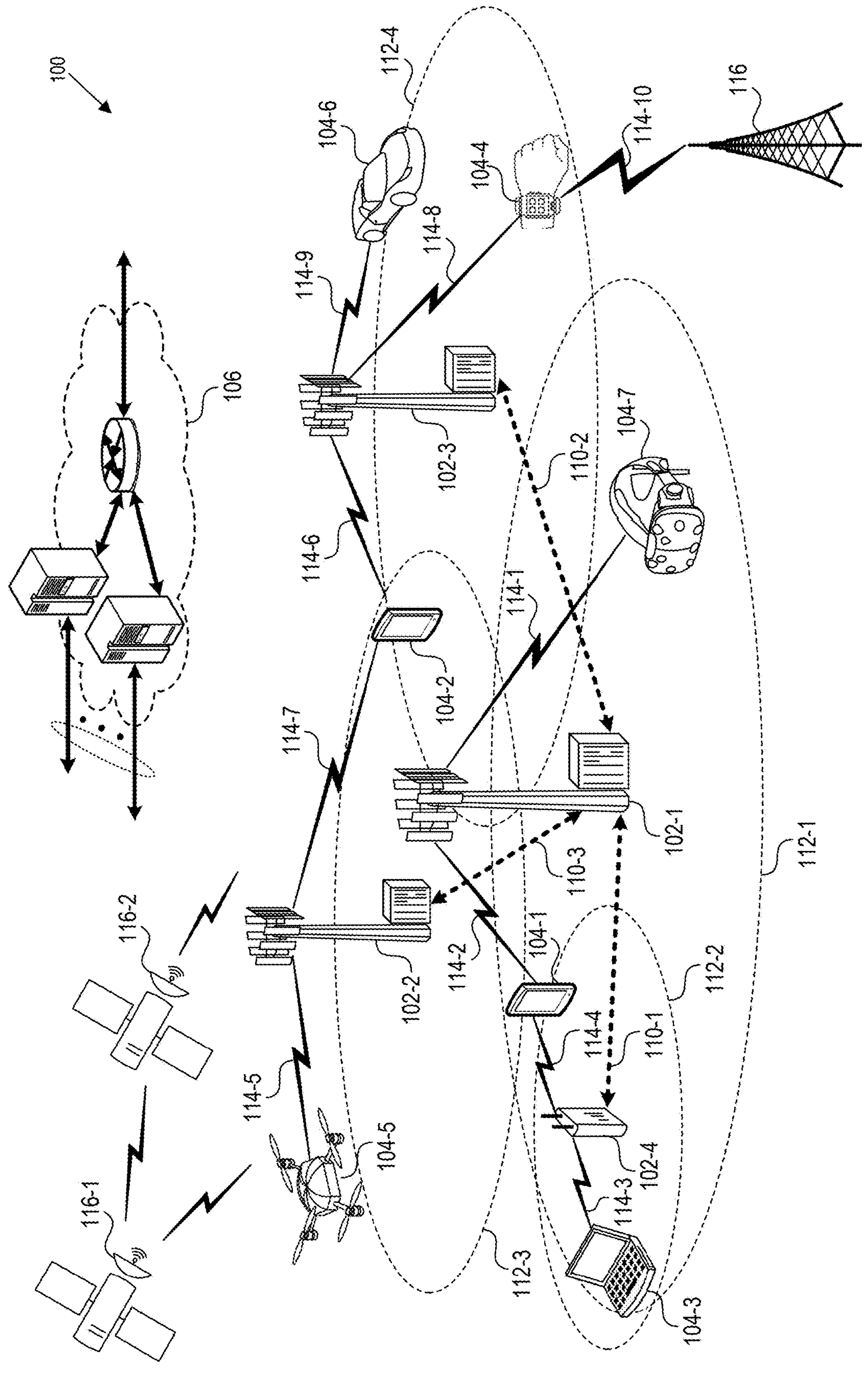
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Network slicing is a network architecture that enables the multiplexing of virtualized and independent logical networks on the same physical network infrastructure. Currently, network carriers apply settings for an entire slice for all users within that slice without accounting for dynamic changes in application requirements. This patent document discloses techniques that can be implemented in various embodiments to allow dynamic modification of slice configurations. In some embodiments, a feedback mechanism is provided to enable user devices to provide feedback information to the core network so as to determine dynamic updates for the slicing configuration. In some embodiments, machine learning techniques can be leveraged to categorize feedback information into different profiles. The different profiles can allow the core network to provide updates to user devices that experience similar slicing behaviors.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
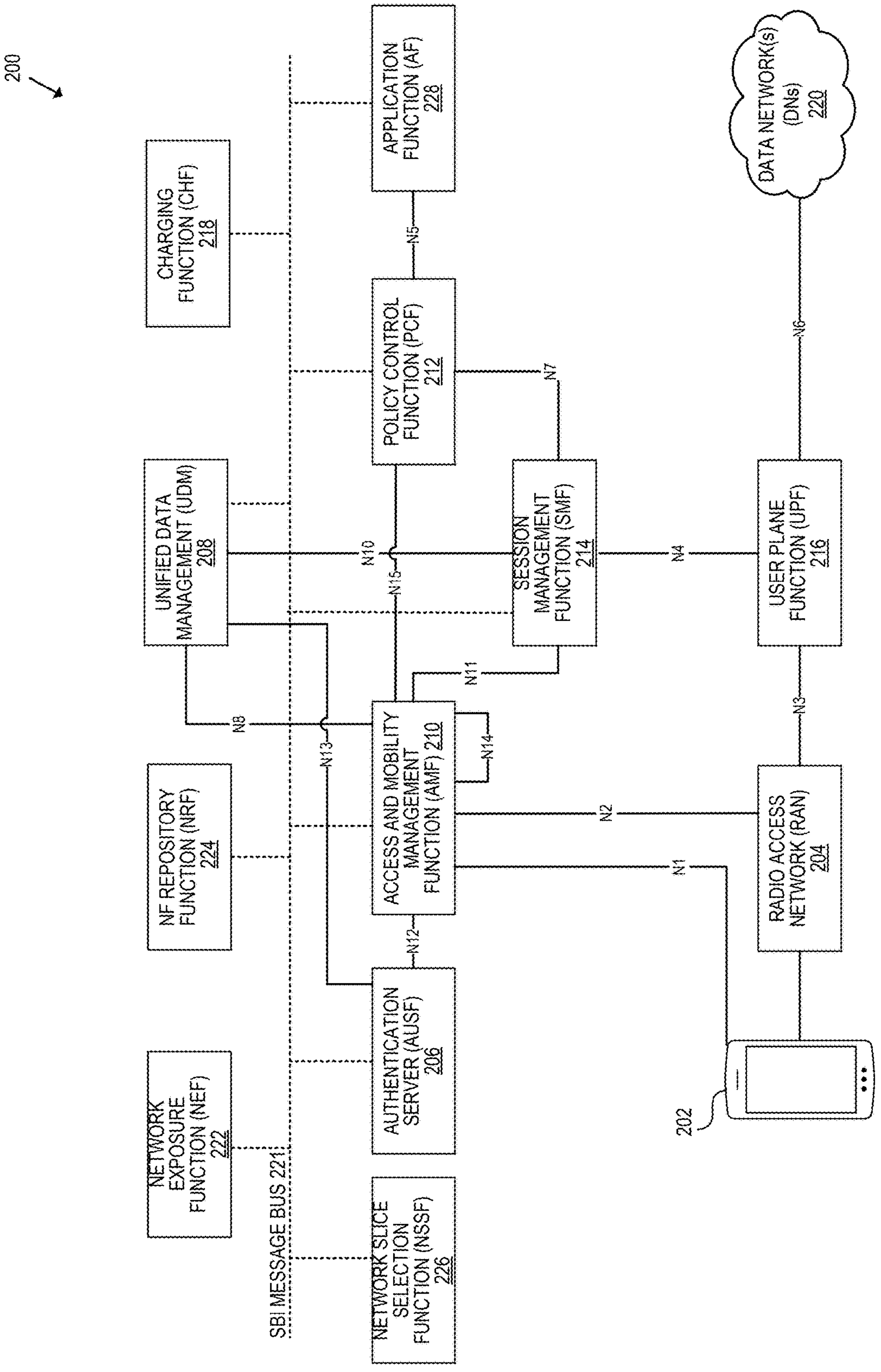
FIG. 2 is a block diagram that illustrates Fifth Generation (5G) core network functions (NFs) that can implement aspects of the present technology.

FIG. 2 is a block diagram that illustrates an architecture 200 including 5G core NFs that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Dynamic Slicing Modification

In 5G communication systems, network slicing is a network architecture that enables the multiplexing of virtualized and independent logical networks on the same physical network infrastructure. Each network slice is an isolated end-to-end network tailored to fulfill diverse requirements requested by a particular application. Network slicing enables the construction/modification of services across the network domains. For example, service orchestration sets policies to meet Service-Level Agreements (SLAs) defined for the service.

Figure 3:
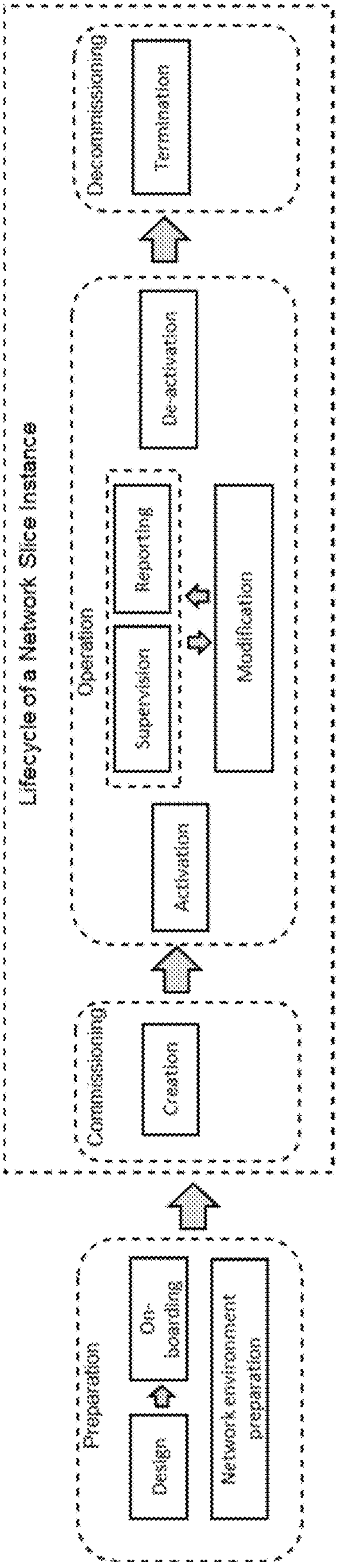
FIG. 3 illustrates an example lifecycle of a network slice instance.

A slice instance can be created and activated by a network orchestrator. The network orchestrator is a network entity that automates the end-to-end lifecycle of infrastructure at scale. This includes installing the Operating System (OS), configuring and updating Commercial Off-The-Shelf (COTS) servers, configuring networking and storage, installing clusters, onboarding NFs and Network Service (NS) lifecycle management, and configuring resources. The orchestrator also supports the network slicing lifecycle. FIG. 3 illustrates an example lifecycle of a network slice instance. Upon receiving a request, the orchestrator provisions the different domains (Radio Access Network, Transport, and Core Network Details regarding the network orchestration framework can be found in the 3GPP Technical Specification 38.533).

In existing networks, slicing is configured based on throughput or bandwidth settings per slice by the network operator. For example, protocols such as the Resource Reservation Protocol, which reserves resources across network systems, or metrics such as Requests per second (RPS), which measures the throughput of a system, can be used to determine the slice configurations. However, mismatches may exist between the slice configuration and usage. For example, a user device can be configured with an uplink-heavy slice, but the user may not upload content so frequently, leading to a waste of uplink resources.

To align slice configurations with the usage behavior of the user devices, network carriers can examine the application type associated with the slice (e.g., a streaming application or a gaming application) and provide initial settings based on a reference application having a similar type. For example, iPhone developers can specify the application category (e.g., gaming, communication, or streaming) and/or traffic category (e.g., video for low-delay tolerant, very low-loss tolerant, inelastic flow, and constant packet rate connections or calling for low-loss tolerant, inelastic flow, jitter tolerant, etc.) to enable appropriate network slicing features. Similarly, Android offers traffic descriptors, based on the Third-Generation Partnership Project (3GPP) Technical Specification (TS) 24.526, to convert network requests to slice categories. Android also includes a slicing upsell feature that lets carriers offer enhanced network capabilities to their users through network slicing.

The initial settings provided by the network carriers are unilaterally applied for an entire slice for all users within that slice. The settings do not account for the fact that application requirements are not static and there is a need for the system to dynamically adapt to assess and meet the requirements. Also, the initial settings may not account for certain usage scenarios that affect part of the users. Currently, there is no feedback mechanism for the application to inform the network functions/elements that its slicing requirement is not met. There is no mechanism on the slicing orchestrator side to dynamically determine how the configurations need to be adjusted.

This patent document discloses techniques that can be implemented in various embodiments to allow dynamic modification of slice configurations.

Feedback-Based Slice Dynamic Modification

Figure 4:
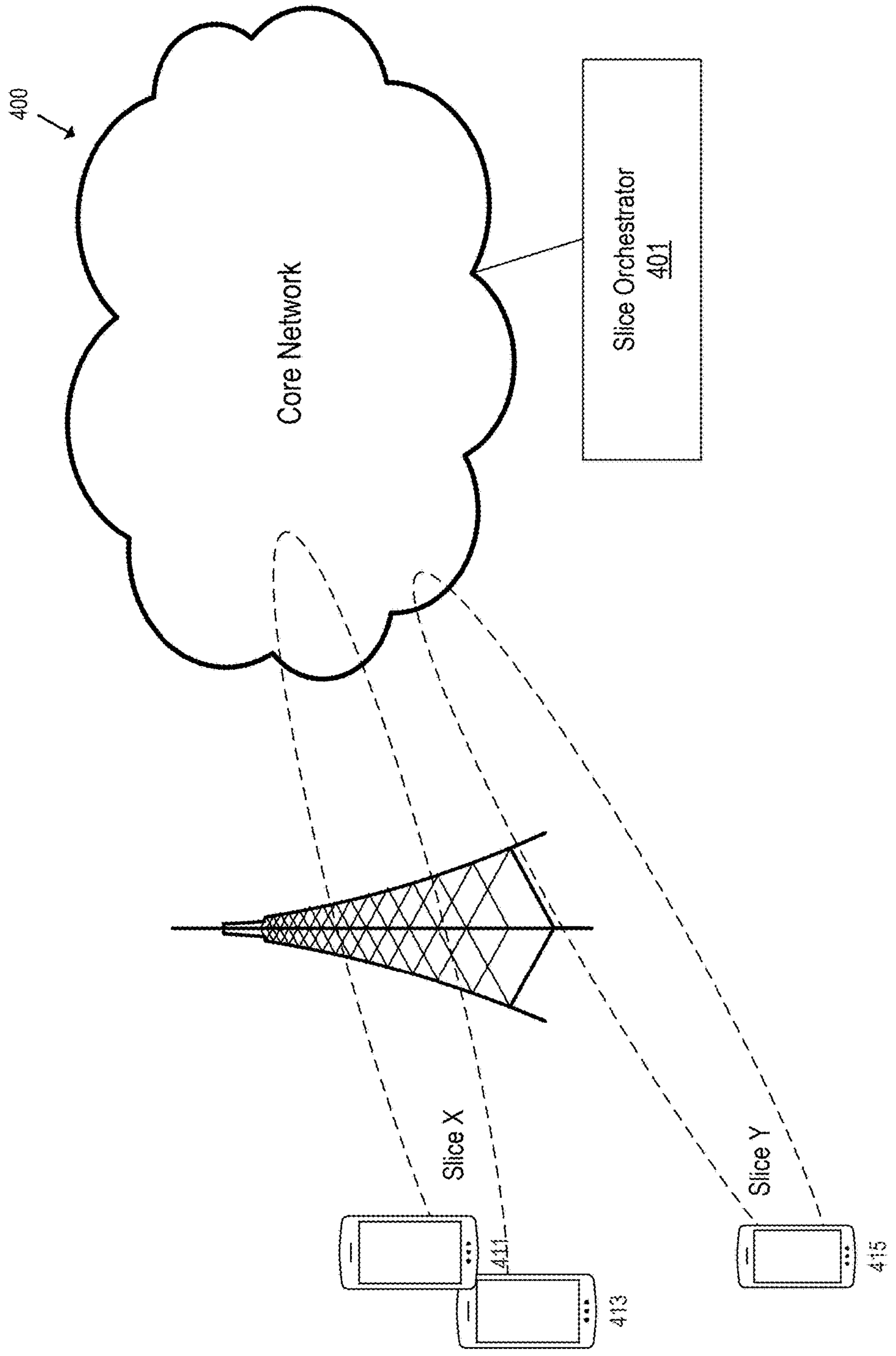
FIG. 4 illustrates an example architecture in accordance with one or more embodiments of the present technology.

FIG. 4 illustrates an example architecture 400 in accordance with one or more embodiments of the present technology. The user devices can be configured with different slices, which are managed by the slice orchestrator 401 in the core network. Multiple devices (e.g., 411, 413, 415) can be configured using the same slice configurations.

Figure 5A:
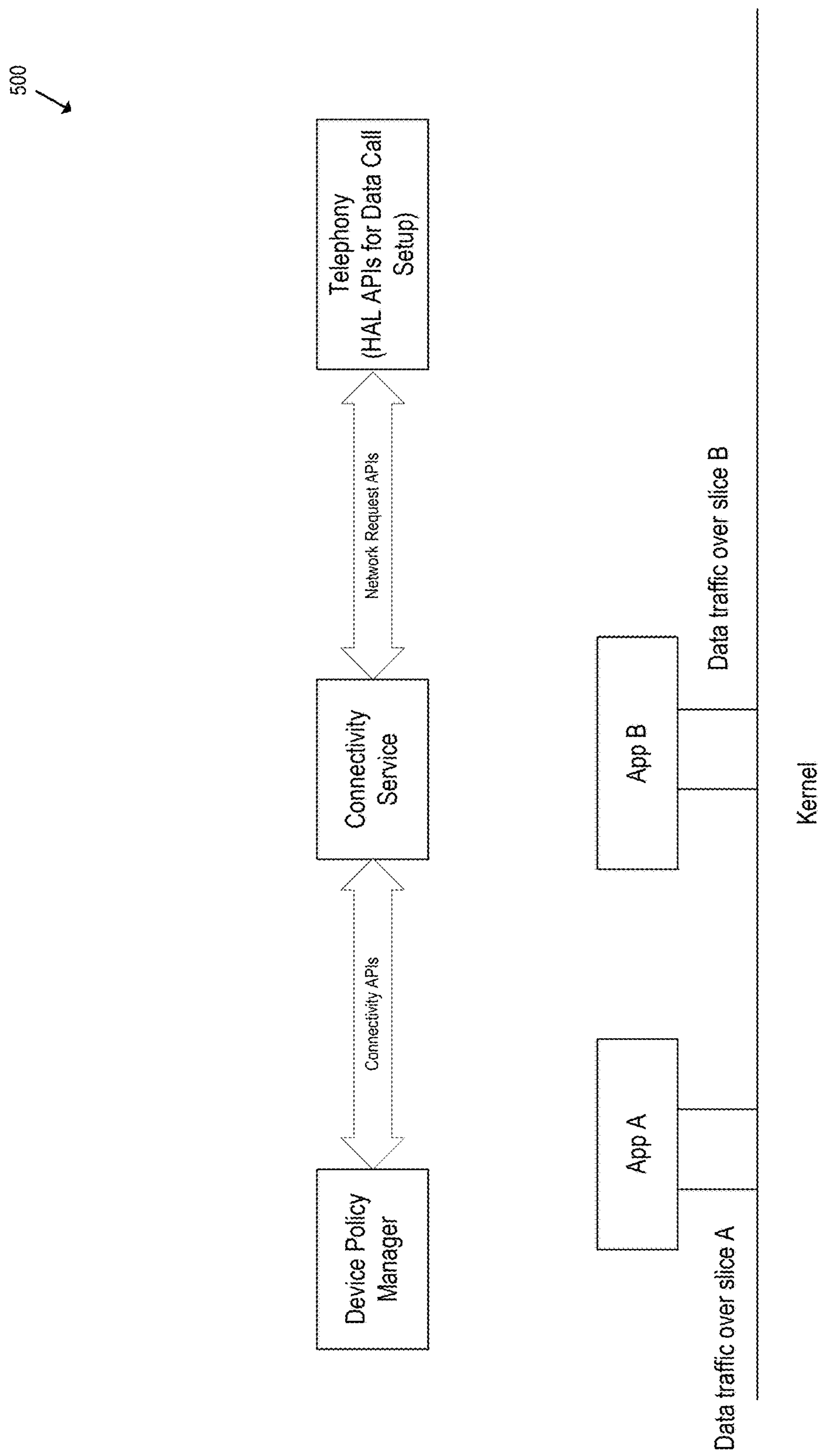
FIG. 5A illustrates example components of the 5G network slicing feature in Android systems.
Figure 5B:
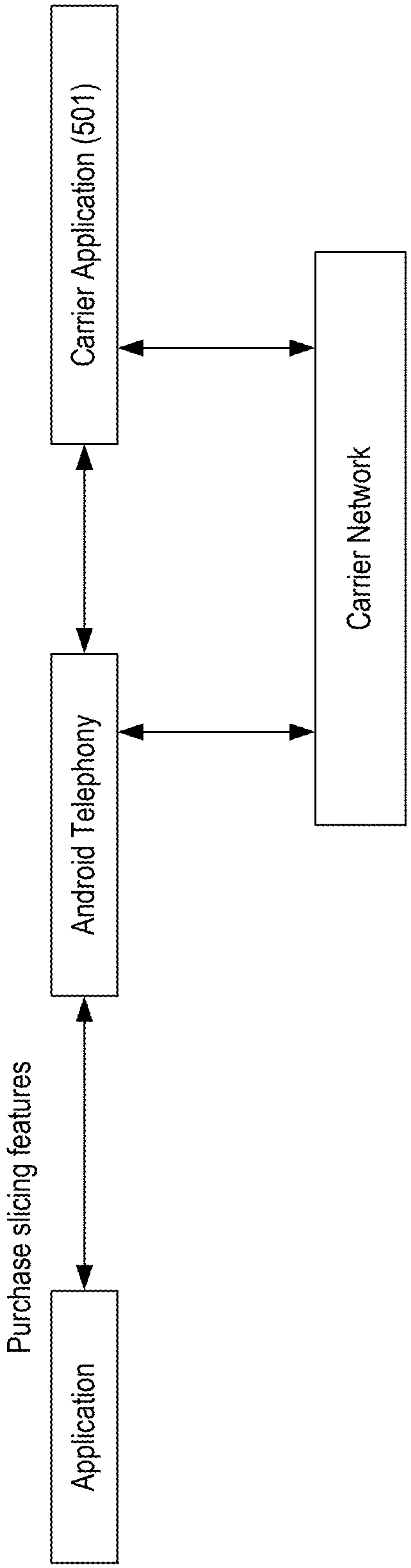
FIG. 5B illustrates example components of the 5G slicing upsell feature in Android systems.

In some embodiments, the operator can provide a set of Application Programming Interfaces (APIs) to allow the mobile device to communicate with the slice orchestrator to provide feedback. Using Android as an example, Android introduces support for 5G network slicing to incorporate existing connectivity APIs that are required for network slicing. The Android Telephony platform provides Hardware Abstraction Layer (HAL) and telephony APIs to support slicing based on network requests filed by the core networking code and 5G slicing capabilities in the modem. FIG. 5A illustrates example components of the 5G network slicing feature 500 in Android systems. Android systems also support the 5G slicing upsell feature, which lets carriers offer enhanced network capabilities (latency and bandwidth) to their users through 5G network slicing. FIG. 5B illustrates example components of the 5G slicing upsell feature in Android systems. Requests to purchase slicing features (e.g., additional bandwidth and/or better latency performance) are transmitted to Android Telephony and directed to a carrier application (501). The carrier application 501, along with the Android Telephony service, communicates with the carrier network to allocate appropriate resources for the slice. Carriers can customize the behavior of the 5G slicing upsell feature using carrier configurations, which control whether purchase requests can be made, when apps are allowed to request premium capabilities, and how long the Telephony framework waits for responses from the user or the network.

When the application is used and configured to instantiate a slice, in addition to the traffic descriptor as specified in the TS 24.526, the slice requirements can be communicated by newly defined or existing APIs to the orchestrator. The APIs can include several fields to allow a developer to communicate the slice requirements. Example fields include frame loss, throughput, jitter, packet loss, latency, etc. In some embodiments, the fields are included in a new Information Element (IE), such as "slicing quality indicator." In some embodiments, the IE includes indicators for desired values as well as measured values. In some embodiments, the IE includes information that corresponds to a service profile (e.g., a service profile identifier) that is mapped to parameters indicating the slicing quality. The information included in the IE, as well as User Equipment Route Selection Policy (URSP) rules, can be translated over L3 signaling to the network and be cascaded to different elements in the path (e.g., access node, UPF, etc.) to reach the orchestrator.

Figure 6A:
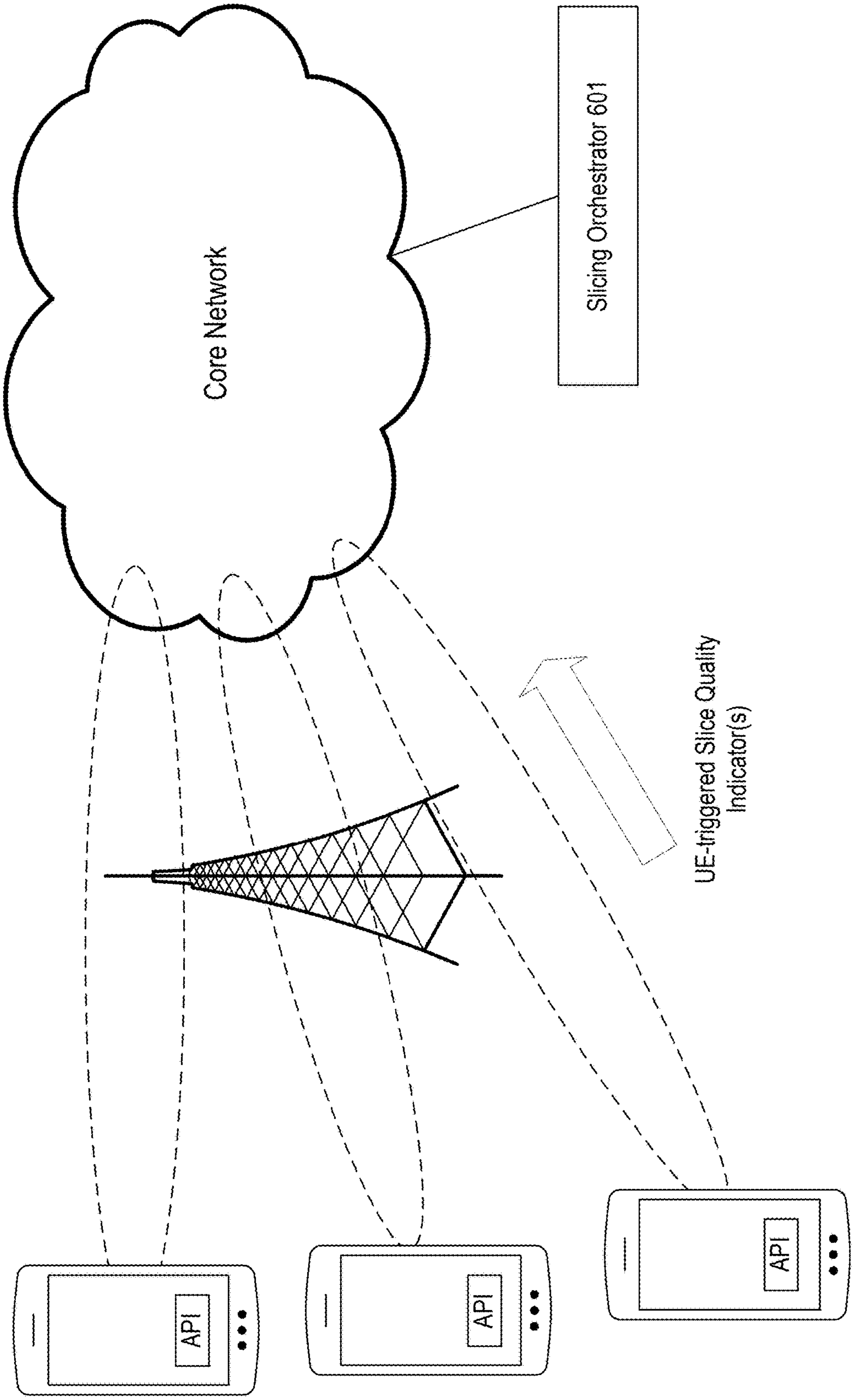
FIG. 6A is an example diagram illustrating a feedback-based dynamic slice modification in accordance with one or more embodiments of the present technology.
Figure 6B:
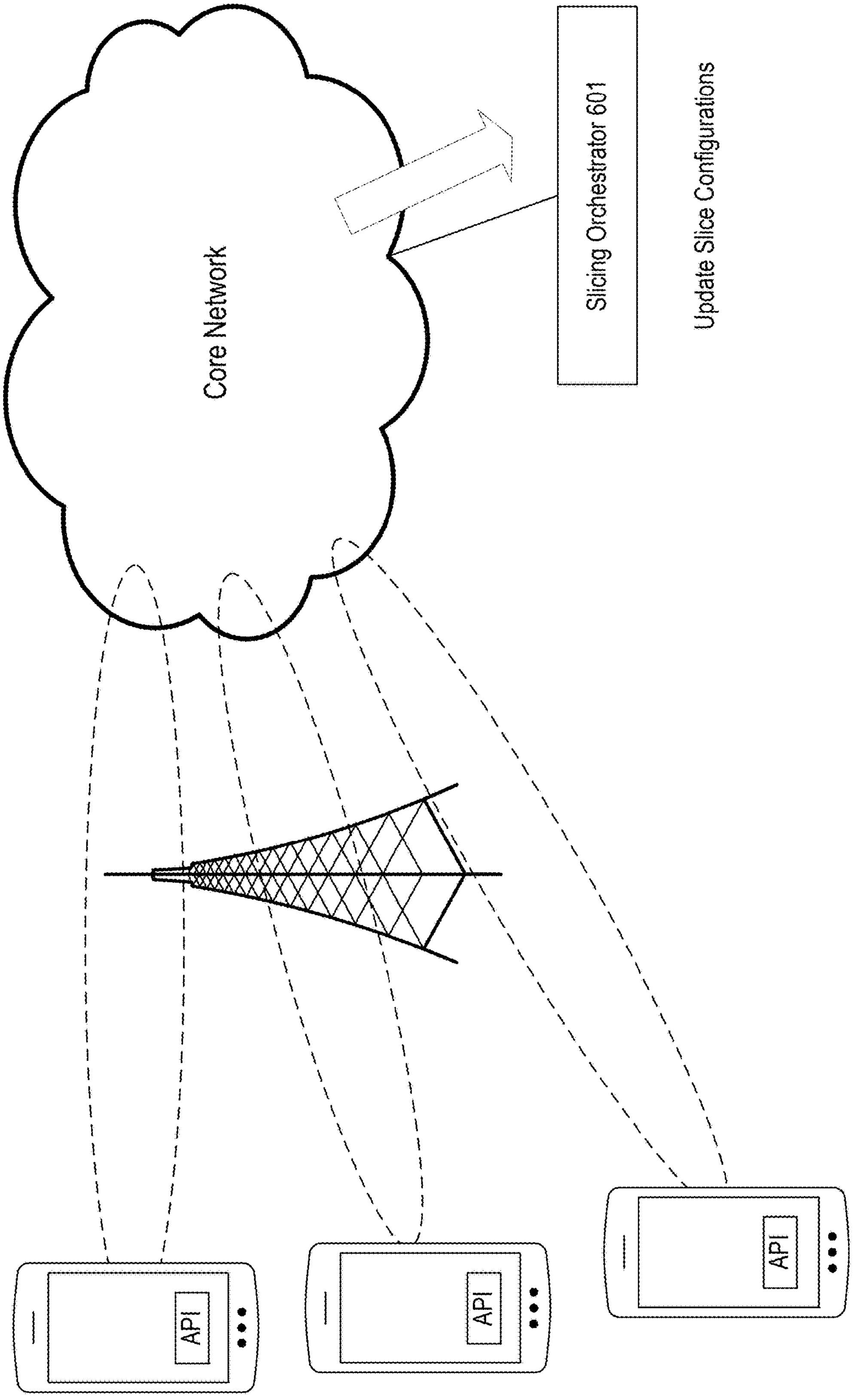
FIG. 6B is another example diagram illustrating a feedback-based dynamic slice modification in accordance with one or more embodiments of the present technology.
Figure 6C:
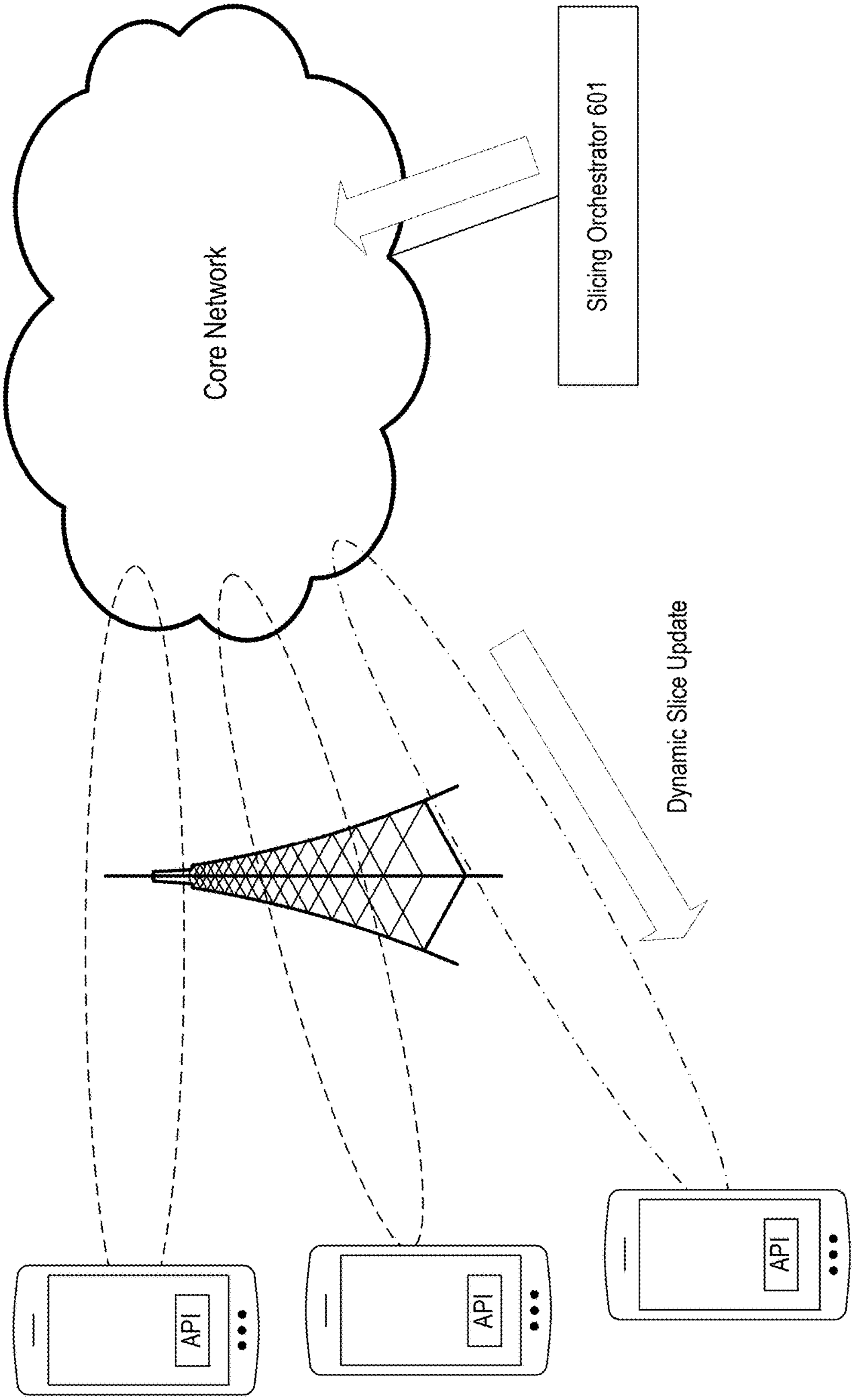
FIG. 6C is yet another example diagram illustrating a feedback-based dynamic slice modification in accordance with one or more embodiments of the present technology.

FIGS. 6A-6C illustrate an example feedback-based dynamic slice modification in accordance with one or more embodiments of the present technology. During the execution of the application, as shown in FIG. 6A, performance of the application is observed by the carrier application (e.g., 501 shown in FIG. 5B). Upon observing that the slice performance does not meet its performance requirements, the application can trigger an update via a signaling message (e.g., that includes the "slicing quality indicator" IE), bound for the slicing orchestrator 601.

Upon receiving the feedback information via the IE, as shown in FIG. 6B, the slicing orchestrator 601 can analyze and compare the expected slice performance with the actual slice performance and determine a delta that represents the difference. Alternatively, this delta can be directly communicated by the API via the message. Based on the delta, the slicing orchestrator 601 modifies configurations corresponding to the slice, including but not limited to resource allocations, bandwidth, throughput configurations, and Quality of Service (QoS) indicators.

As shown in FIG. 6C, the slicing orchestrator 601 then communicates the modification to the corresponding slice-related network functions or network elements to make the required changes. In some embodiments, the updated configurations are "persistent" in that the changes are in effect until a subsequent message including "slicing quality indicator" IE is communicated by API. If no such communication is received, then it is assumed that the slice quality meets the requirements.

This way, user application is no longer subject to fixed slicing feature, RRP/RPS, and QoS requirements and leads to optimal end user experience.

Artificial Intelligent (AI)-Assisted Dynamic Modification

As discussed above, upon receiving the information indicating the slicing quality (e.g., a message comprising the "slicing quality indicator" IE), the slicing orchestrator performs analysis to determine the delta representing the difference between the expected and actual performance. In some embodiments, the delta can be directly communicated to the slicing orchestrator via the message indicating the slicing quality. The slicing orchestrator then determines the appropriate changes to the configurations based on the delta.

In some embodiments, the delta representing the difference between the expected and actual performance is determined using one or more machine learning models. The slice requirements can be represented using multiple measurements. Some of the measurements may exceed the expected values, while some of the measurements may fall short. Different combinations of measurement results indicate different network behaviors that require different types of updates of the slice configurations.

In some embodiments, the measurement results can be modeled to correspond to different profiles using AI/machine learning (ML) techniques. To train the AI/ML models, measurement data can be collected from various sources such as network traffic logs, performance metrics, and monitoring tools. Such data is first preprocessed, e.g., by removing or imputing missing values, filtering out noise, and correcting errors and/or scaling the data to a standard range to ensure uniformity. A set of relevant features associated with the slice is identified so that the AI/ML models can transform raw data into meaningful features that are extracted for modeling. In some embodiments, clustering algorithms (e.g., K-means, DBSCAN, and/or hierarchical clustering), classification algorithms (e.g., decision trees, random forests, and support vector machines), and/or anomaly detection algorithms (e.g., Isolation Forest, One-Class SVM, and autoencoders) can be used.

The trained AI/ML models can then categorize measurement data from user devices into different profiles. The profile(s) can be indicated to the slice orchestrator via the IE included in the signaling message (e.g., where the one or more AI/ML models are deployed on the user device) or be determined by the slice orchestrator directly (e.g., where the one or more AI/ML models are deployed on the slice orchestrator).

Figure 7:
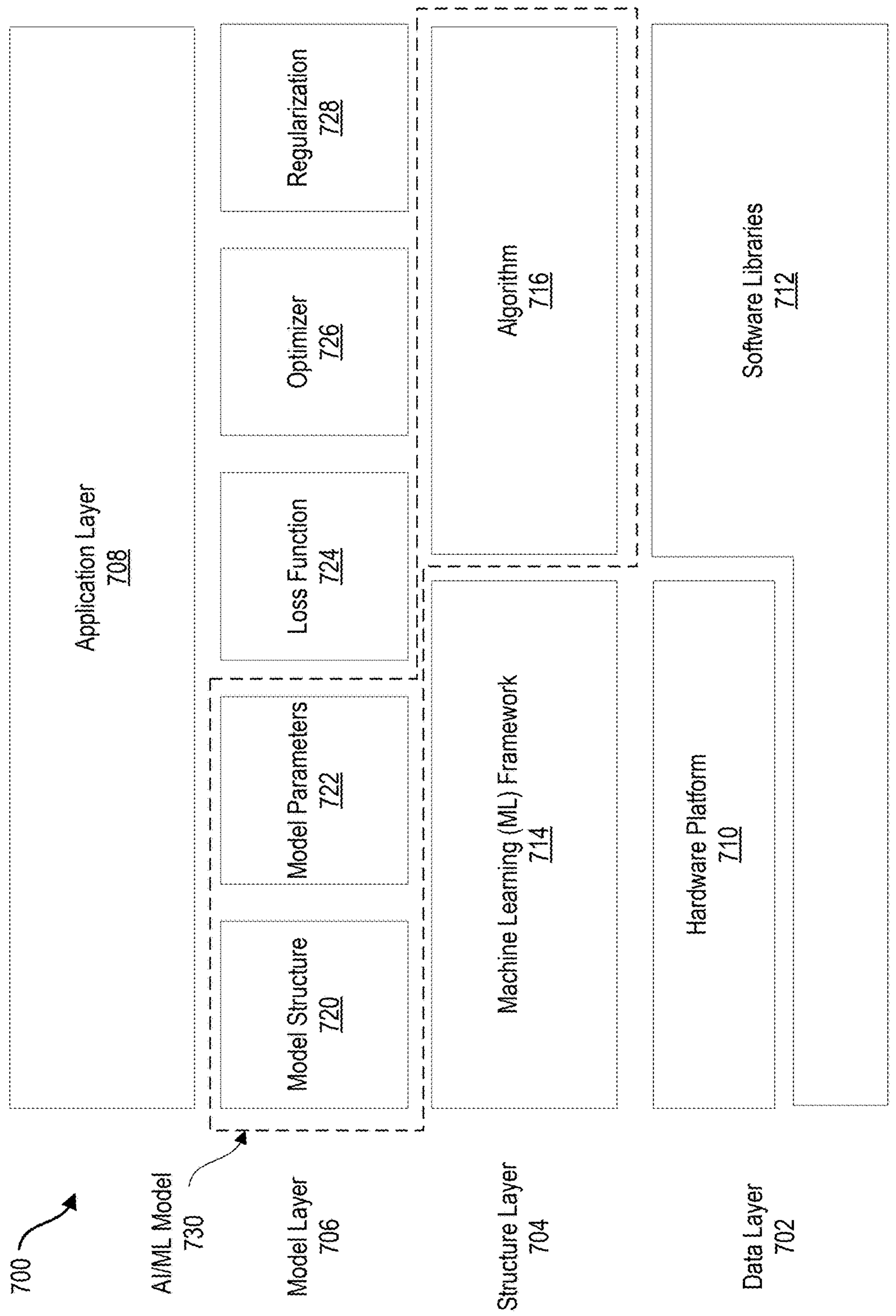
FIG. 7 illustrates an example Artificial Intelligence (AI)/Machine Learning (ML) system in accordance with one or more embodiments of the present technology.

FIG. 7 illustrates an example AI/ML system 700 in accordance with one or more embodiments of the present technology. The AL/ML system 700 can include a set of layers, which conceptually organize elements within an example network topology for the AI system's architecture to implement a particular AI/ML model 730. Generally, an AI/ML model 730 is a computer-executable program implemented by the AI/ML system 700 that analyses data to make predictions. Information can pass through each layer of the AI/ML system 700 to generate outputs for the AI/ML model 730. The layers can include a data layer 702, a structure layer 704, a model layer 706, and an application layer 708. The algorithm 716 of the structure layer 704 and the model structure 720 and model parameters 722 of the model layer 706 together form the example AI/ML model 730. The optimizer 726, loss function engine 724, and regularization engine 728 work to refine and optimize the AI/ML model 730, and the data layer 702 provides resources and support for application of the AI/ML model 730 by the application layer 708.

The data layer 702 acts as the foundation of the AI system 700 by preparing data for the AI/ML model 730. As shown, the data layer 702 can include two sub-layers: a hardware platform 710 and one or more software libraries 712. The hardware platform 710 can be designed to perform operations for the AI/ML model 730 and include computing resources for storage, memory, logic and networking, such as the user device(s) or the slice orchestrator. The hardware platform 710 can process amounts of data using one or more servers. The servers can perform backend operations such as matrix calculations, parallel calculations, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 can include Infrastructure as a Service (IaaS) resources, which are computing resources, (e.g., servers, memory, etc.) offered by a cloud services provider. The hardware platform 710 can also include computer memory for storing data about the AI/ML model 730, application of the AI/ML model 730, and training data for the AI/ML model 730. The computer memory can be a form of random-access memory (RAM), such as dynamic RAM, static RAM, and non-volatile RAM.

The software libraries 712 can be thought of as suites of data and programming code, including executables, used to control the computing resources of the hardware platform 710. The programming code can include low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include Intel Math Kernel Library, Nvidia cuDNN, Eigen, and Open BLAS.

The structure layer 704 can include an AI/ML framework 714 and an algorithm 716. The ML framework 714 can be thought of as an interface, library, or tool that allows users to build and deploy the AI/ML model 730. The AI/ML framework 714 can include an open-source library, an application programming interface (API), a gradient-boosting library, an ensemble method, and/or a deep learning toolkit that work with the layers of the AI system facilitate development of the AI/ML model 730. For example, the AI/ML framework 714 can distribute processes for application or training of the AI/ML model 730 across multiple resources in the hardware platform 710. The AI/ML framework 714 can also include a set of pre-built components that have the functionality to implement and train the AI/ML model 730 and allow users to use pre-built functions and classes to construct and train the AI/ML model 730. Thus, the AI/ML framework 714 can be used to facilitate data engineering, development, hyperparameter tuning, testing, and training for the AI model 730. Examples of AI/ML frameworks 714 that can be used in the AI/ML system 700 include TensorFlow, PyTorch, Scikit-Learn, Keras, Cafffe, LightGBM, Random Forest, and Amazon Web Services.

The algorithm 716 can be an organized set of computer-executable operations used to generate output data from a set of input data and can be described using pseudocode. The algorithm 716 can include complex code that allows the computing resources to learn from new input data and create new/modified outputs based on what was learned. In some implementations, the algorithm 716 can build the AI/ML model 730 through being trained while running computing resources of the hardware platform 710. This training allows the algorithm 716 to make predictions or decisions without being explicitly programmed to do so. Once trained, the algorithm 716 can run at the computing resources as part of the AI/ML model 730 to make predictions or decisions, improve computing resource performance, or perform tasks. The algorithm 716 can be trained using supervised learning, unsupervised learning, semi-supervised learning, and/or reinforcement learning.

In some embodiments, the slice orchestrator can organize the profiles into different groups. For example, when a user device reports the information indicating the slicing quality, the slice orchestrator can allocate the user device into a service profile group based on the indicated information (e.g., a profile identifier or the parameters indicating the differences in behavior). The slice orchestrator can perform further analysis of the measurement data from user devices in the same group and determine appropriate slice configuration changes that are applicable to the group.

In some embodiments, based on the analysis, the slice orchestrator modifies the parameters (e.g., QoS, resource allocations, bandwidth, throughput configurations, etc.) for the profile (e.g., corresponding to the profile identifier) or the profile group. The slice orchestrator communicates the modification to the corresponding slice-related elements to make the required changes.

In some embodiments, after the modification, the slice orchestrator deallocates the user device from the profile group if the observed network resources used by the user device start to align with the expected slicing behaviors.

Figure 8A:
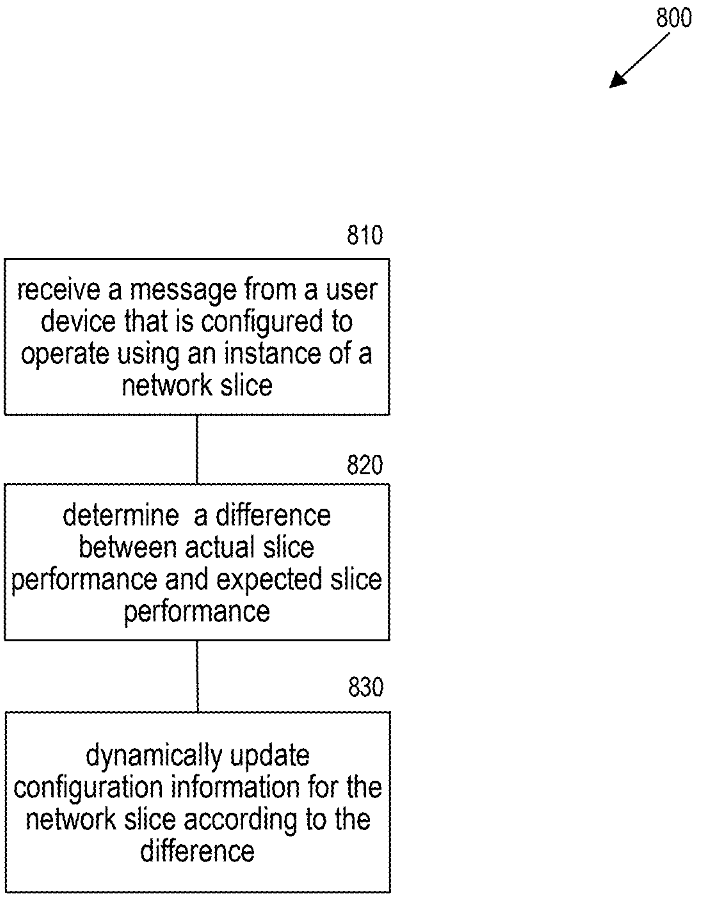
FIG. 8A is a flowchart representation of a method for wireless communication in accordance with one or more embodiments of the present technology.

FIG. 8A is a flowchart representation of a method for wireless communication in accordance with one or more embodiments of the present technology. The method 800 includes, at operation 810, receiving, by a network server implemented as a slice orchestrator, a message from a user device that is configured to operate using an instance of a network slice. The network slice is associated with one or more network characteristics for an application. The message comprises feedback information indicating a quality of the network slice. The method 800 includes, at operation 820, determining, by the slice orchestrator, a difference between actual slice performance and expected slice performance based on the feedback information indicating the quality of the network slice. The method 800 includes, at operation 830, dynamically updating, by the slice orchestrator, configuration information for the network slice according to the difference between the actual slice performance and the expected slice performance.

In some embodiments, the message comprises an Information Element (IE) that includes the feedback information indicating the quality of the network slice. For example, the IE comprises a slicing quality indicator IE. In some embodiments, the feedback information indicating the quality of the network slice comprises a profile identifier determined based on the actual slice performance. In some embodiments, the method includes allocating the user device into a profile group based on the profile identifier. The updated configuration information is determined for one or more user devices in the profile group. In some embodiments, the method includes removing the user device from the profile group upon the actual slice performance of the user device substantially matching the expected slice performance. In some embodiments, the actual slice performance is represented using one or more measurements that include at least one of: a frame loss, a throughput value, a jitter value, a packet loss, or a latency value.

Figure 8B:
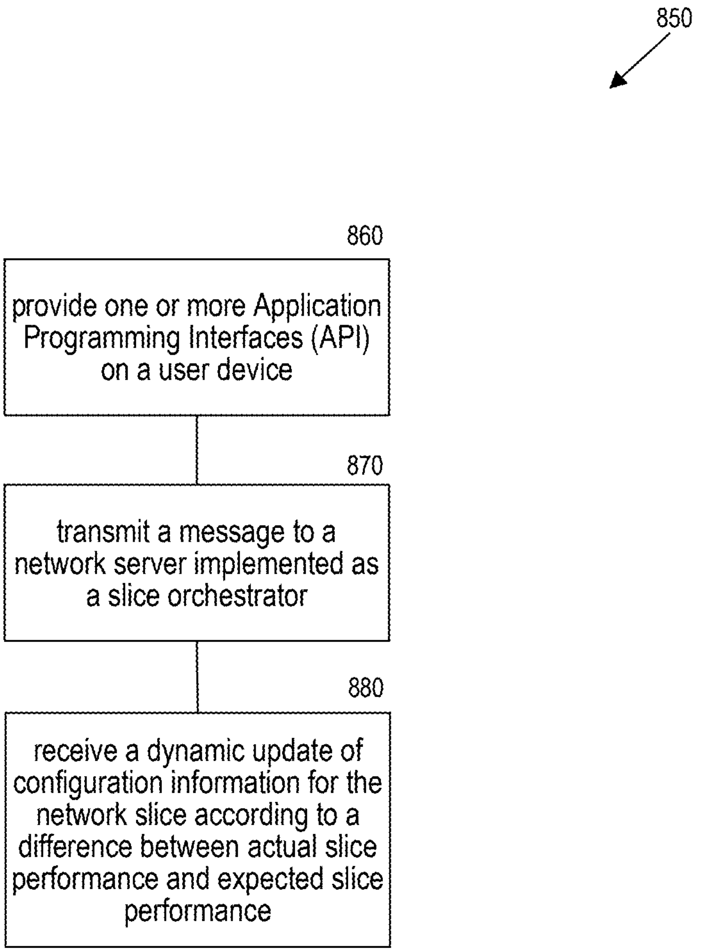
FIG. 8B is a flowchart representation of a method for wireless communication in accordance with one or more embodiments of the present technology.

FIG. 8B is a flowchart representation of a method for wireless communication in accordance with one or more embodiments of the present technology. The method 850 includes, at operation 860, providing one or more Application Programming Interfaces (API) on a user device that is configured to operating using an instance of a network slice. The network slice is associated with one or more network characteristics for an application. The method 850, at operation 870, transmitting, from the user device, a message to a network server implemented as a slice orchestrator. The message comprises feedback information indicating a quality of the network slice. The method 850 includes, at operation 880, receiving, by the user device, a dynamic update of configuration information for the network slice according to a difference between actual slice performance and expected slice performance determined based on the feedback information indicating the quality of the network slice.

In some embodiments, the message comprises an Information Element that includes the feedback information indicating the quality of the network slice. In some embodiments, the feedback information indicating the quality of the network slice comprises a profile identifier determined based on the actual slice performance. In some embodiments, the profile identifier corresponds to a profile group, and wherein one or more user devices in the profile group are configured to receive the dynamic update of the configuration information for the network slice. In some embodiments, the actual slice performance is represented using one or more measurements that include at least one of: a frame loss, a throughput value, a jitter value, a packet loss, or a latency value. In some embodiments, the dynamic update of configuration information is applicable to the user device before the user device transmitting a second message to the slice orchestrator with second feedback information indicating the quality of the network slice.

Figure 9A:
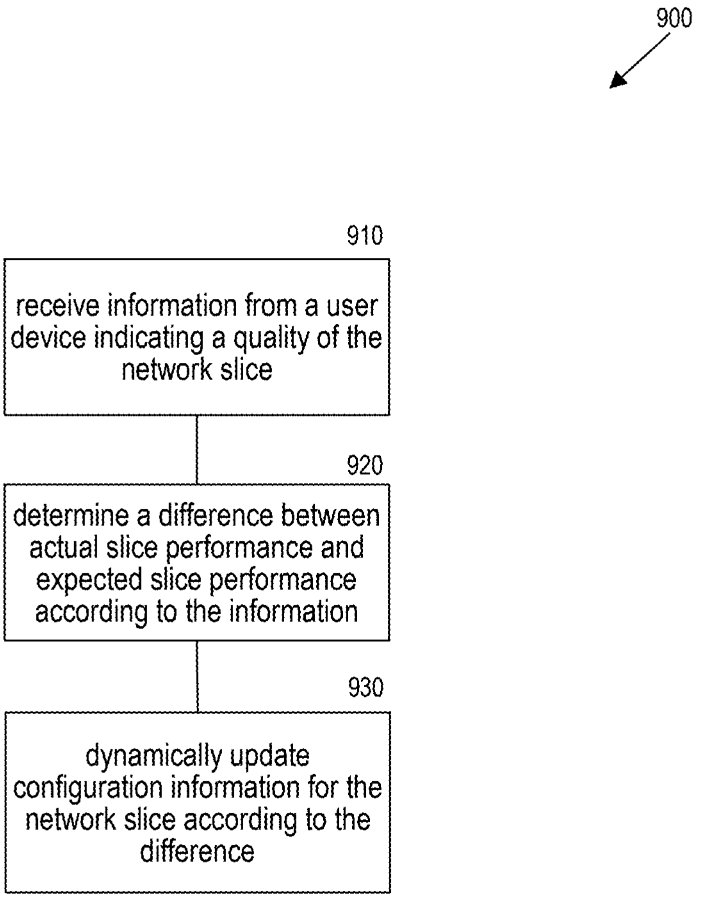
FIG. 9A is a flowchart representation of a method for wireless communication in accordance with one or more embodiments of the present technology.

FIG. 9A is a flowchart representation of a method for wireless communication in accordance with one or more embodiments of the present technology. The method 900 includes, at operation 910, receiving, by a network server implemented as a slice orchestrator, information from a user device that is configured to operate using an instance of a network slice. The information indicates a quality of the network slice, and the network slice is associated with one or more network characteristics for an application. The method 900 includes, at operation 920, determining, by the slice orchestrator based on one or more machine learning models, a difference between actual slice performance and expected slice performance according to the information. The method 900 includes, at operation 930, dynamically updating, by the slice orchestrator, configuration information for the network slice according to the difference between the actual slice performance and the expected slice performance.

In some embodiments, the one or more machine learning models are implemented using one or more algorithms comprising at least one of: a clustering algorithm, a classification algorithm, or an anomaly detection algorithm. In some embodiments, the one or more machine learning models are trained using measurement data comprising one or more network traffic logs or one or more performance metrics. In some embodiments, the method includes determining, using the one or more machine learning models, a profile identifier based on the information indicating the quality of the network slice. In some embodiments, the method includes allocating the user device into a profile group based on the profile identifier, where the updated configuration information is determined for one or more user devices in the profile group. In some embodiments, the method includes removing the user device from the profile group upon the actual slice performance of the user device substantially matching the expected slice performance. In some embodiments, the actual slice performance is represented using one or more measurements that include at least one of: a frame loss, a throughput value, a jitter value, a packet loss, or a latency value.

Figure 9B:
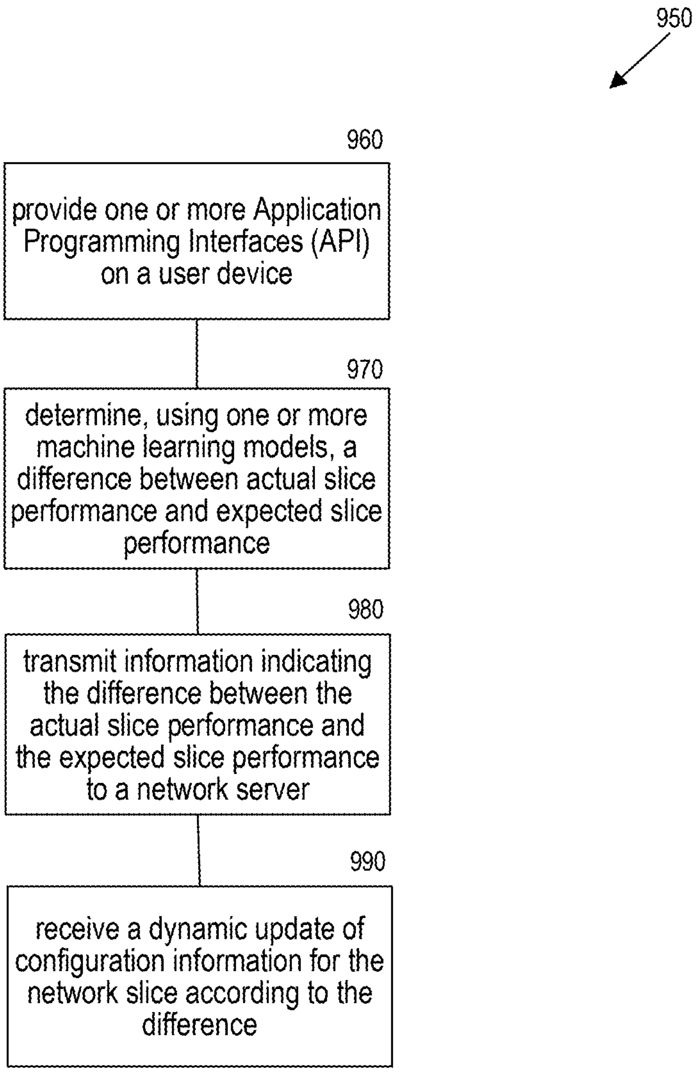
FIG. 9B is a flowchart representation of a method for wireless communication in accordance with one or more embodiments of the present technology.

FIG. 9B is a flowchart representation of a method for wireless communication in accordance with one or more embodiments of the present technology. The method 950 includes, at operation 960, providing one or more Application Programming Interfaces (API) on a user device that is configured to operating using an instance of a network slice. The network slice is associated with one or more network characteristics for an application. The method 950 includes, at operation 970, determining, by the user device using one or more machine learning models, a difference between actual slice performance and expected slice performance based on information indicating a quality of the network slice. The method 950 includes, at operation 980, transmitting, from the user device, information indicating the difference between the actual slice performance and the expected slice performance to a network server. The method 950 also includes, at operation 990, receiving, by the user device, a dynamic update of configuration information for the network slice according to the difference.

In some embodiments, the one or more machine learning models are implemented using one or more algorithms comprising at least one of: a clustering algorithm, a classification algorithm, or an anomaly detection algorithm. In some embodiments, the one or more machine learning models are trained using measurement data comprising one or more network traffic logs or one or more performance metrics. In some embodiments, the method includes determining, using the one or more machine learning models, a profile identifier based on the information indicating the quality of the network slice. In some embodiments, the profile identifier corresponds to a profile group, and wherein one or more user devices in the profile group are configured to receive the dynamic update of the configuration information for the network slice. In some embodiments, the dynamic update of configuration information is applicable to the network server before the user device transmitting a second message to the network server with second feedback information indicating the quality of the network slice.

Computer System

Figure 10:
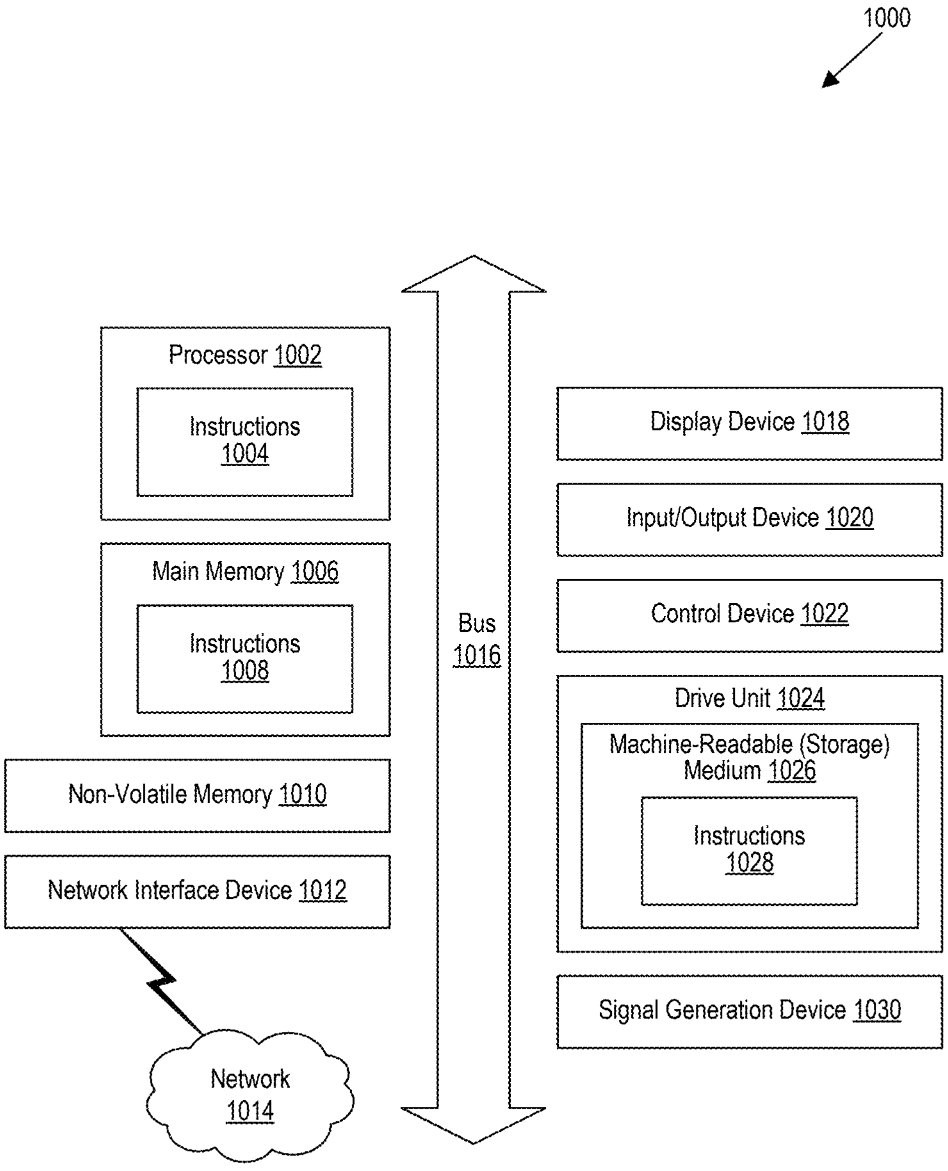
FIG. 10 is a block diagram that illustrates an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a video display device 1018, an input/output device 1020, a control device 1022 (e.g., keyboard and pointing device), a drive unit 1024 that includes a machine-readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computing system 1000 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1000. In some implementations, the computer system 1000 can be an embedded computer system, a system-on-chip (SOC), a single-board computer system (SBC), or a distributed system such as a mesh of computer systems, or it can include one or more cloud components in one or more networks. Where appropriate, one or more computer systems 1000 can perform operations in real time, in near real time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable medium 1026 can include any medium that is capable of storing, encoding, or carrying a set of instructions for execution by the computing system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memory and storage devices in computing device(s). When read and executed by the processor 1002, the instruction(s) cause the computing system 1000 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

What is claimed is:

1. A method for wireless communication, comprising:

receiving, by a network server implemented as a slice orchestrator, information from a user device that is configured to operate using an instance of a network slice, wherein the information indicates a quality of the network slice, wherein the network slice is associated with one or more network characteristics for an application;

determining, by the slice orchestrator based the on one or more machine learning models, a difference between actual slice performance and expected slice performance according to the information;

determining, using one or more machine learning models, a profile identifier based on the information indicating the quality of the network slice, allocating the user device into a profile group based on the profile identifier;

dynamically updating, by the slice orchestrator, configuration information for the network slice according to the difference the actual slice performance and the expected slice performance, wherein the updated configuration information is determined for one or more user devices in the profile group; and removing the user device from the profile group upon the actual slice performance of the user device being within a threshold amount of the expected slice performance.

2. The method of claim 1, wherein the one or more machine learning models are implemented using one or more algorithms comprising at least one of: a clustering algorithm, a classification algorithm, or an anomaly detection algorithm.

3. The method of claim 1, wherein the one or more machine learning models are trained using measurement data comprising one or more network traffic logs or one or more performance metrics.

4. The method of claim 1, wherein the actual slice performance is represented using one or more measurements that include at least one of: a frame loss, a throughput value, a jitter value, a packet loss, or a latency value.

5. The method of claim 4, comprising:

determining which or the one or more measurements representing the actual slice performance is different from an expected value.

6. The method of claim 5, comprising:

determining an update type for the configuration information based on which of the one or more measurements is different from an expected value.

7. The method of claim 6, wherein at least two of the measurements are different from the expected value, and wherein at least one of the measurements is below the expected value and at least one of the measurements is above the expected value.

8. A method for wireless communication, comprising:

providing one or more Application Programming Interfaces (API) on a user device that is configured to operating using an instance of a network slice, wherein the network slice is associated with one or more network characteristics for an application;

determining, by the user device using one or more machine learning models, a difference between actual slice performance and expected slice performance based on information indicating a quality of the network slice; and transmitting, from the user device, information indicating the difference between the actual slice performance and the expected slice performance to a network server;

determining, using the one or more machine learning models, a profile identifier based on the information indicating the quality of the network slice, wherein the profile identifier corresponds to a profile group;

receiving, by the user device, a dynamic update of configuration information for the network slice according to the difference, wherein one or more user devices in the profile group are configured to receive the dynamic update of the configuration information for the network slice; and removing the user device from the profile group upon the actual slice performance of the user device within a threshold amount of the expected slice performance.

9. The method of claim 8, wherein the one or more machine learning models are implemented using one or more algorithms comprising at least one of: a clustering algorithm, a classification algorithm, or an anomaly detection algorithm.

10. The method of claim 8, wherein the one or more machine learning models are trained using measurement data comprising one or more network traffic logs or one or more performance metrics.

11. The method of claim 8, wherein the dynamic update of configuration information is applicable to the network server before the user device transmitting a second message to the network server with second feedback information indicating the quality of the network slice.

12. The method of claim 8, wherein the actual slice performance is represented using one or more measurements that include at least one of: a frame loss, a throughput value, a jitter value, a packet loss, or a latency value, the method comprising:

determining which or the one or more measurements representing the actual slice performance is different from an expected value.

13. The method of claim 12, comprising:

determining an update type for the configuration information based on which of the one or more measurements is different from an expected value.

14. A wireless communication device implemented as a slice orchestrator, comprising at least one processor that is configured to cause the wireless communication device to:

receive information from a user device that is configured to operate using an instance of a network slice, wherein the information indicates a quality of the network slice, wherein the network slice is associated with one or more network characteristics for an application;

determine, based on one or more machine learning models, a difference between actual slice performance and expected slice performance according to the information;

determine, using the one or more machine learning models, a profile identifier based on the information indicating the quality of the network slice, allocate the user device into a profile group based on the profile identifier;

dynamically update configuration information for the network slice according to the difference between the actual slice performance and the expected slice performance, wherein the updated configuration information is determined for one or more user devices in the profile group; and remove the user device from the profile group upon the actual slice performance of the user device within a threshold amount of the expected slice performance.

15. The wireless communication device of claim 14, wherein the one or more machine learning models are implemented using one or more algorithms comprising at least one of: a clustering algorithm, a classification algorithm, or an anomaly detection algorithm.

16. The wireless communication device of claim 14, wherein the one or more machine learning models are trained using measurement data comprising one or more network traffic logs or one or more performance metrics.

17. The wireless communication device of claim 14, wherein the updated configuration information is applicable to the user device before the user device transmitting a second message to the slice orchestrator with second feedback information indicating the quality of the network slice.

18. The wireless communication device of claim 14, wherein the actual slice performance is represented using one or more measurements that include at least one of: a frame loss, a throughput value, a jitter value, a packet loss, or a latency value, wherein the at least one processor is configured to cause the wireless communication device to:

determine which or the one or more measurements representing the actual slice performance is different from an expected value.

19. The wireless communication device of claim 18, wherein the at least one processor is configured to cause the wireless communication device to:

determine an update type for the configuration information based on which of the one or more measurements is different from an expected value.

20. The wireless communication device of claim 19, wherein at least two of the measurements are different from the expected value, and wherein at least one of the measurements is below the expected value and at least one of the measurements is above the expected value.

* * * * *